United States Patent
Caputo, II

(10) Patent No.: US 8,824,299 B1
(45) Date of Patent: Sep. 2, 2014

(54) SELECTING NETWORK SERVICES BASED ON HOSTNAME

(71) Applicant: tw telecom holdings, inc., Littleton, CO (US)

(72) Inventor: Pete Joseph Caputo, II, Highlands Ranch, CO (US)

(73) Assignee: tw telecom holdings, inc., Littleton, CO (US)

( * ) Notice: Subject to any disclaimer, the term of this patent is extended or adjusted under 35 U.S.C. 154(b) by 0 days.

(21) Appl. No.: 14/193,768

(22) Filed: Feb. 28, 2014

(51) Int. Cl.
*H04L 12/28* (2006.01)
*H04L 12/56* (2006.01)

(52) U.S. Cl.
CPC .............. *H04L 45/22* (2013.01); *H04L 45/742* (2013.01)
USPC ............ 370/235; 370/392; 370/400; 709/223

(58) Field of Classification Search
None
See application file for complete search history.

(56) References Cited

U.S. PATENT DOCUMENTS

| | | | |
|---|---|---|---|
| 2010/0199188 A1* | 8/2010 | Abu-Hakima et al. | 715/733 |
| 2013/0070745 A1* | 3/2013 | Nixon et al. | 370/338 |
| 2013/0301413 A1* | 11/2013 | Moen et al. | 370/235 |

* cited by examiner

*Primary Examiner* — Chi Pham
*Assistant Examiner* — Shick Hom
(74) *Attorney, Agent, or Firm* — Sterne, Kessler, Goldstein & Fox PLLC

(57) ABSTRACT

In an embodiment, a method configures a network to route data on a first network service that connects a user's network with a service provider network. In the method, an instruction to route data from the network addressed to a hostname on the first network service is received. According to the hostname, a first IP address that addresses a server identified by the hostname is determined. A second IP address is also determined as the second IP address of the specific network service. Finally, a message is sent to the user's network that specifically instructs the user's network to route data addressed to the first IP address to the second IP address. The message causes configuration of a router on the user's network to route data on the first network service. System and computer program product embodiments are also disclosed.

20 Claims, 4 Drawing Sheets

SELECTING NETWORK SERVICES BASED ON HOSTNAME

BACKGROUND

1. Field

This field is generally related to network routing.

2. Related Art

Network services may, for example, provide connectivity from a customer network to another computer network, such as the Internet. A network service may have particular service level agreement that guarantees certain service characteristics, such as bandwidth, latency, and jitter. Some customer networks have more than one network service that connects them to the Internet. Having multiple network services may provide redundancy.

To help select which network service to use, a network service may advertise routing information, using for example a protocol like Border Gate Protocol (BGP). Based on the routing information, routers on the customer network may know to route data to one network service over another. However, many conventional ways of advertising routing information lack configurability.

One way to provide configurability is to use policy-based routing (PBR). Policy-based routing (PBR) is a technique used to make routing decisions based on policies set by the network administrator. For example, when a router receives a packet it normally decides where to forward it based on the destination address in the packet, which is then used to look up an entry in a routing table. However, in some cases, there may be a need to forward the packet based on other criteria. For example, PBR provides a way for a network administrator to forward a packet based on the source address, instead of the destination address.

Being able to configure which network service to use to connect to the Internet may help guarantee a level of service for that traffic. For example, voice over IP (VoIP) traffic may require a shorter latency than other IP traffic. For that reason, a network administrator may want to direct VoIP traffic along one network service, while directing other IP traffic along another.

BRIEF SUMMARY

In an embodiment, a method configures a network to route data on a first network service that connects a user's network with a service provider network. In the method, an instruction to route data addressed to a hostname on the first network service is received. According to the hostname, a first IP address that addresses a server identified by the hostname is determined. A second IP address is also determined as the second IP address of the specific network service. Finally, a message is sent to the user's network that specifically instructs the user's network to route data addressed to the first IP address to the second IP address. The message causes configuration of a router on the user's network to route data on the first network service over a second network service that has a more general routing entry encompassing the first IP address.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

As described above, the ability to configure which traffic takes which network service offers benefits. However, that configurability can be complicated and difficult. Embodiments simplify the configuration by providing the ability for customers to assign particular DNS hostnames to particular network services. Once a customer assigns a DNS hostname to a network service, embodiments send configuration messages to a router on the customer's network, updating the router's routing tables to direct traffic addressed to the assigned hostname to the assigned network service.

Figure 1:
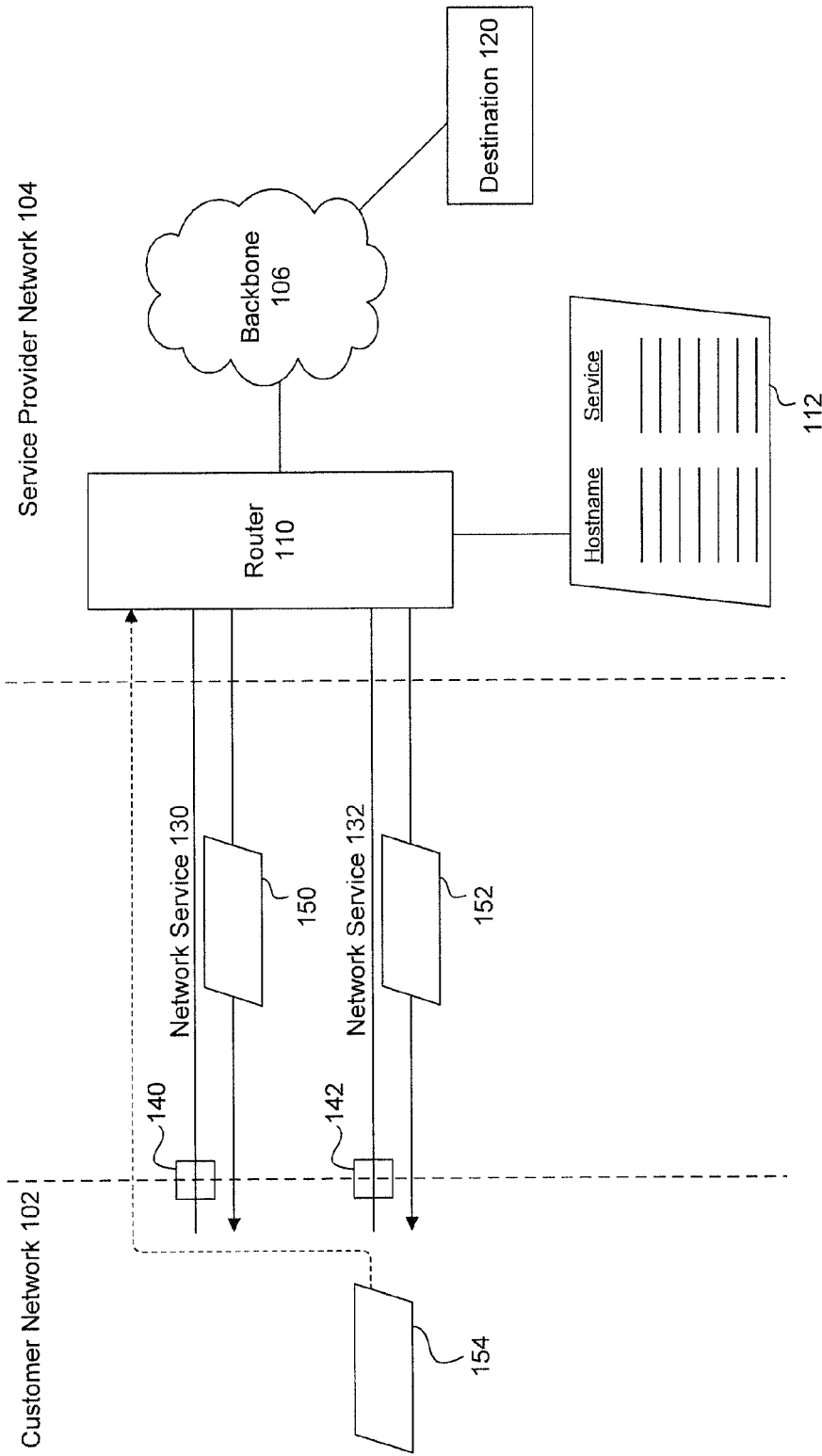
FIG. 1 is a diagram of a system for selecting network services based on hostname, according to an embodiment.

FIG. 1 is a diagram 100 of a system for selecting network services based on hostnames, according to an embodiment. The system includes a customer network 102 and a service provider network 104.

Customer network 102 may, for example, be a local area network confined to a particular area, such as a building. In another example, customer network 102 may be a company intranet connecting different computers in the same organization. The various computers may have web browsers or other applications that require access to resources via a network, such as a private network or the Internet. Customer network 102 may use TCP/IP routing protocols, and the computers on customer network 102 may use a publicly or privately addressable IP addresses.

Service provider network 104 connects to customer network 102 with different network services: a network service 130 and a network service 132. As mentioned above, each network service may provide connectivity at a particular service level, which may be defined by a service level agreement. The service level may specify an amount of available bandwidth, a minimum latency, a maximum amount of jitter or other parameters.

Each of the network services 130 and 132 connects a router 110, which is on service provider network 104, to a port on customer network 102. In particular, network service 130 connects router 110 to a port 140, and network service 132 connects router 110 to a port 142. Each of the ports 140 and 142 may be, for example, on a router of the customer network 102.

Through router 110, network services 130 and 132 provide a connection to a backbone 106. Backbone 106, for example, may include the public Internet. Backbone 106 may include a plurality of routers and interconnecting links. Router 110 sends data to other routers on backbone 106, which route the data through to its destination.

To determine how to route data, the various routers on backbone 106 can exchange messages advertising their connectivity. The messages may for example be BGP messages. In that example, the routers that exchange messages may be BGP peers. Using these messages, the various routers can develop routing tables that define how to route data through the network.

Not only do various routers on backbone 106 exchange messages, router 110 exchanges messages with at least one router on customer network 102. In FIG. 1, these messages are illustrated as messages 150 and 152 on respective network services 130 and 132. In an example, messages 150 and 152 may include listing of IP subnets and associated next-hop IP addresses. According to messages 150 and 152, a router on customer network 102 may configure their own routing tables to incorporate the messages. The customer router may, for example, route data to the most specific IP subnet matching the destination address and transmit data to the associative next-hop address. Based on this information, the customer router decides which network service to route data on.

In an embodiment, router 110 sends messages 150 and 152 according to a user configuration mapping a hostname to particular service. In particular, a user can configure a table 112 to map various host names to either network service 130 or 132. Router 110 generates and sends messages 150 and 152 to update the customer router to route data addressed to the hostname to either network services 130 or 132. In particular, messages 150 and 152 are generated to update the customer router to route data addressed to the IP address of the hostname. To determine the IP address, router 110, or another component on service provider network 104, conducts a DNS lookup of the hostname to determine the IP address(es) of the host(s) resources making up the service(s). Then, messages 150 and 152 are generated to direct traffic over the particular network service designated by the user.

Once updated, customer network 102 routes data over one network service versus another in accordance with the user configuration. Each packet having a destination IP address of the host is routed over the particular network service.

FIG. 1 illustrates an example packet 154. In an example, a router on customer network 102 is updated to route traffic addressed to a particular hostname on a network service 130. The router on customer network 102 evaluates the destination address of packet 154 against the subnets in its routing table. Among the various routing table entries, the most specific match is identified to determine the next-hop. The configuration messages already updated the routing table entries to match the destination IP address against an entry for the next hop address of the user's network service 130. For this reason, the next hop IP address directs packet 154 along network service 130, as illustrated in FIG. 1.

Figure 2:
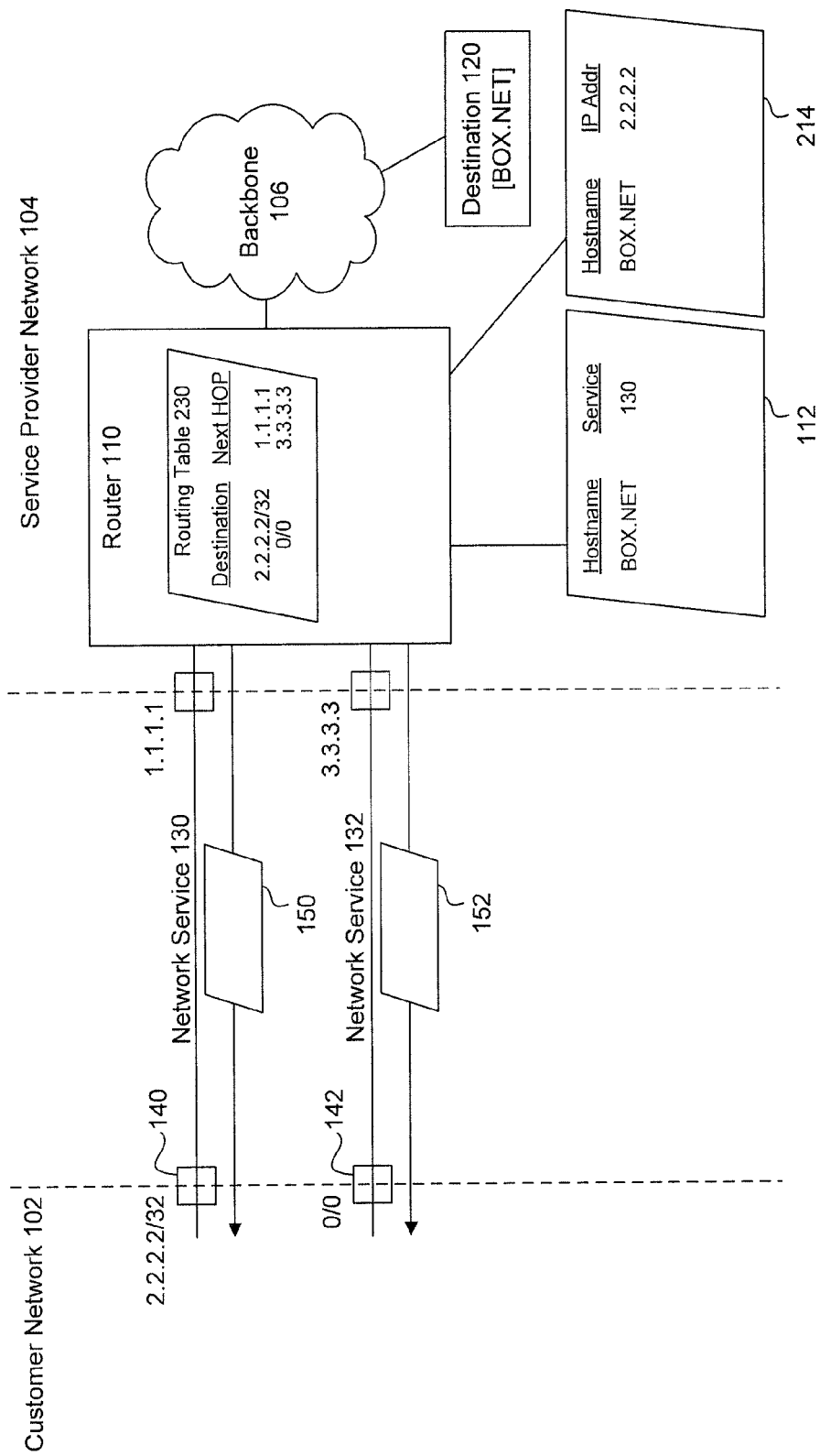
FIG. 2 is a diagram showing an example operation of the system in FIG. 1.

FIG. 2 is a diagram 200 showing an example operation of the system in FIG. 1 in greater detail. As above, diagram 200 shows that the system includes customer network 102, service provider network 104, router 110, and table 112. In addition, diagram 200 shows that router 110 includes a routing table 230 that is coupled to a DNS cache 214 and that backbone 106 is coupled to a destination 120.

In the example in diagram 200, router 110 has two IP addresses, one for each network service. For network service 130, router 110 has an IP address 1.1.1.1, and, for network service 132, router 110 has IP address 3.3.3.3. IP addresses for network service 130 may be assigned by the service provider for service provider network 104. Different service providers may be different autonomous systems and may have a range of IP addresses that they can assign to customers.

In the example, the user wants to route all data addressed to a hostname box.net over network service 130. Accordingly, the user configures table 112 to map "box.net" to network service 130, as shown in diagram 200. To configure table 112, a customer may use, for example, a web portal offered by the service provider.

On configuration of the new entry in table 112, an IP address for the hostname is retrieved and stored in DNS cache 214. The DNS lookup may be done, for example, using the public domain name service, using record lookups via a utility or methods those skilled in the art typically use. In the example in diagram 200, box.net has an IP address 2.2.2.2, and DNS cache 214 is updated to reflect that address.

Then, based on the service and IP address, routing table 230 in router 110 is updated. Routing table 230 maps particular destination subnet masks to next-hop IP addresses. After a new hostname is configured and the hostname's IP address is retrieved, a new entry may be added to routing table 230, to reflect the configuration. In particular, a specific entry may be added mapping the precise IP address and subnet mask (designated as 2.2.2.2/32) to the IP address for network service 130, which is 1.1.1.1.

With the routing table in router 110 updated, router 110 sends messages to its neighbors, such as its BGP peers, to update their routing tables accordingly. In this case, router 110 sends messages 150 and 152 to customer network 102.

In response to messages 150 and 152, a router on customer network 102 may for example have two entries, one for subnet 2.2.2.2/32 and another for all other traffic (designated by subnet mask 0/0). The customer network 102's router uses the entry that most specifically matches the destination address.

With the configuration complete, a computer on customer network 102 may attempt to contact box.net. When that happens, a DNS lookup for box.net occurs and the IP address for box.net is determined as 2.2.2.2. The computer sends packets addressed to box.net to that IP address. Then, a router on customer network 102 determines that the most specific match for packets having that destination address is 2.2.2.2/32. That entry matches to the next hop IP address 1.1.1.1, which is the IP address corresponding to network service 130. In this way, embodiments route data addressed to a particular hostname—in this case, box.net—to a particular network service.

By mapping a hostname to the network service in this way, a user can better manage traffic across its network. For example, a user may want to route certain traffic to a particular destination—such as to salesforce.com—to achieve a certain level of service. Alternatively, the user may want to balance traffic across various network services. Configuring network services using a hostname, as opposed to an IP address or other means, makes the configuration relatively easy.

Figure 3:
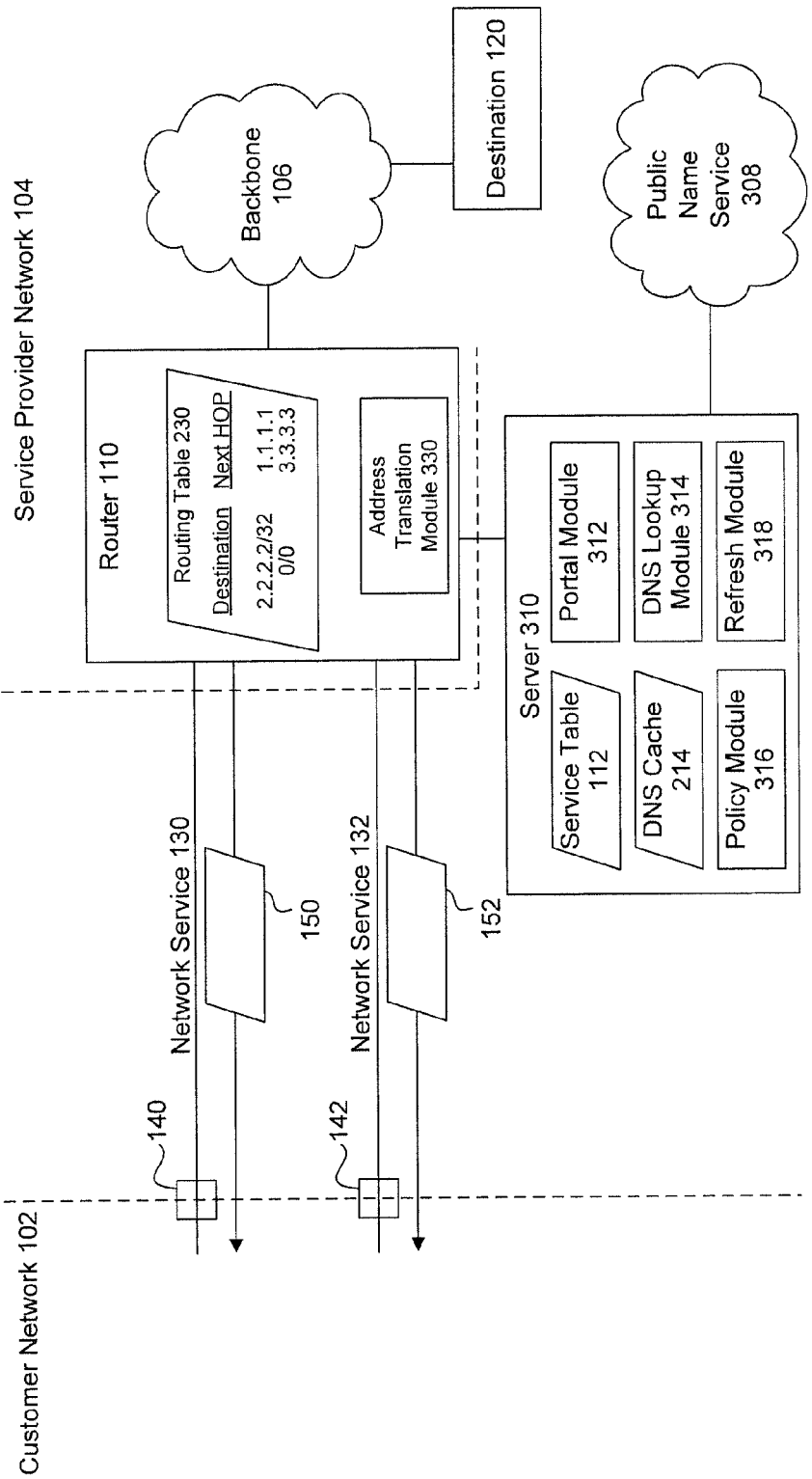
FIG. 3 is a diagram showing the system of FIG. 1 in greater detail.

FIG. 3 is a diagram 300 showing the system of FIG. 1 and its example operation in greater detail. In addition to the components shown in diagrams 100 and 200, diagram 300 shows that service table 112 and DNS cache 214 are located on a server 310. Server 310 is coupled to router 110 and a public domain name service 308, and includes a portal module 312, a DNS lookup module 314, a policy module 316, and a refresh module 318. Router 110 also includes an address translation module 330. Each of these components is discussed in turn.

Portal module 312 receives, from a user, an instruction to route data from the network addressed to a hostname on the first network service. Portal module 312 may, for example, be a web portal accessible by the customer. The customer may log into the site and may be presented with an interface that lists the service mappings in service table 112. The user may type in the desired hostname, or a portion thereof. The hostname may, for example, be a domain name. For example, a user can type in box.net or www.box.net. Additionally, a user may be able to use wildcards to specify the hostname. For example, the user may be able to match *.box.net to a service. In that case, more than one DNS lookup may be required to get the corresponding IP addresses.

In addition to a hostname resolvable through the public name system, other names may be used. The other names may identify a host or groups of hosts on the network.

After entering a hostname, the user may select one of its network services, for example, from a drop down menu. Then, the user may submit the hostname-network service mapping to portal module 312.

In addition to the hostname-network service mapping, a user could also submit additional conditions about when the mapping is to take effect. For example, the user could submit a business rule instructing the service provider network to switch traffic having the hostname to network service 130 when traffic on network service 132 reaches a utilization level.

When the user specifies additional conditions about when the mapping is to take effect, policy module 316 may evaluate network attributes to determine when the conditions are met. In one embodiment, policy module 316 may determine when traffic on a network service specified in the condition has reached the utilization level. Policy module 316 may make the determination, for example, by collecting data from router 110 or other devices on service provider network 104 or customer network 102.

When the user submits the hostname-service mapping on portal module 312, DNS lookup module 314 determines, according to the submitted hostname, an IP address that addresses the server identified by the hostname. DNS lookup module 314 first looks up the hostname on a local cache and, when no unexpired match is found in the local cache, looks up the hostname on public domain name service 308.

Public domain name service 308 may be the Domain Name System. The Domain Name System (DNS) is a hierarchical distributed naming system for computers, services, or any resource connected to the Internet or a private network. It translates easily memorized domain names to the numerical IP addresses needed for the purpose of locating computer services and devices worldwide. Public name service 308 may include a plurality of name servers. Each domain may have at least one name server that publishes information about that domain and the name servers of any domains subordinate to it. The top of the hierarchy is served by the root name servers, which are the servers to query when looking up (resolving) a top-level domain, like .net. A skilled artisan would recognize that the DNS resource records used here can be A, AAAA, APL, CNAME, which ultimately resolve into IPv4 and IPv6 address(es) and prefix lists.

Once retrieved, the IP address for the associated domain is stored in DNS cache 214. The IP addresses in public name service 308 can change. For that reason, refresh module 318 causes entries in DNS cache to expire. In an embodiment, refresh module 318 may determine that a time period has elapsed since the hostname was retrieved from the domain name service. When refresh module 318 determines that the time period has elapsed, an entry for the hostname in the local cache expires. When the entry expires, DNS lookup module 314 may immediately request a new IP address of the name.

With the DNS cache 214 and service table 112 configured, router 110 sends, to the customers' network, a message specifically instructing the routing table to route data addressed to the hostname's IP address to the network service's IP address, as described above with respect to FIG. 2. In this way, the system directs data to the hostname that originates from customer network 102 over the selected network service.

In addition to directing data originating from customer network 102 over the selected network service, the system may also direct return traffic across the selected network service using an address translation module 330.

As mentioned above, router 110 receives an outgoing packet from customer network 102, and the packet has a source and destination IP address. Router 110 determines whether the destination IP address is among the IP addresses in DNS cache 214, which the user has assigned to a particular network service.

When router 110 determines that the outgoing packet has the assigned host's IP address, address translation module 330 modifies the source IP address of the first packet to replace with a translated IP address such that return traffic addressed to the translated IP address is routed to the network service selected by the user. Then, address translation module 330 forwards the outgoing packet with the modified source IP address to backbone 106.

Backbone 106 forwards the packet according to the destination address to destination 120, just like any other packet. Destination 120 may reply to the data, and, when it does, it replies to the source address that was translated by address translation module 330. And, because the source address was modified to the translated address that routes to the network service selected by the user, the corresponding reply will be routed to the selected network service as well.

On the return route, address translation module 330 has to translate the reply to direct it to the original source. In particular, when the router 110 receives an incoming packet, router 110 evaluates the packet to determine whether it has the translated IP address as its destination.

When router 110 determines that the incoming packet has the translated IP address, router 110 modifies the incoming packet's destination IP address to replace the translated IP address with the source IP address of the original outgoing packet. Then, router 110 forwards the incoming packet with the modified destination address.

In this way, address translation module 330 directs return traffic over the selected network service. In embodiments, address translation module 330 may translate between two publicly accessible addresses or between a private IP address (e.g., 192.168.0.0-192.168.255.255) and a publicly accessible address. In other embodiments, address translation module 330 may translate the TCP ports. Modifying the source TCP ports may, for example, enable more than one source IP to be modified to a single translated IP address. In this embodiment, address translation module 330 can use the different destination ports on the return traffic to direct the traffic to the correct source IP address.

While address translation module 330 is shown on router 110, a skilled artisan would recognize that it may be located elsewhere, such as a router, host, or other device on customer network 102.

While the diagrams in FIGS. 1-3 show both network service 130 and 132 connecting to the same service provider network 104, a skilled artisan would recognize that they could be from different service providers. In that embodiment, the router 110 would operate as described above and identify its own network service as providing the most specific route.

Figure 4:
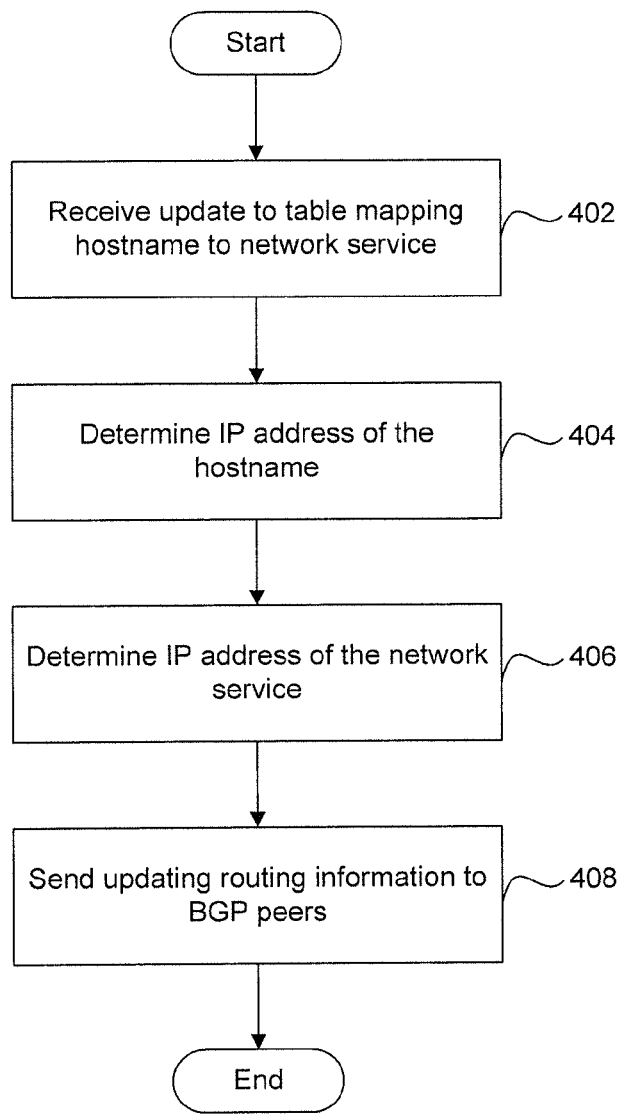
FIG. 4 is a flowchart of a method for selecting network services based on hostname, an according to an embodiment.

FIG. 4 is a flowchart of a method 400 for selecting network services based on hostname, an according to an embodiment.

At step 402, an instruction to route data from the customer network addressed to a hostname on the network service is received from a user. As described above, the instruction may just include a hostname-service mapping or may also include a business rule identifying when the instruction will take effect.

According to the hostname recited at step 402, an IP address is determined that addresses a server identified by the hostname at step 404. As described above, step 404 may include a cache lookup or, if there is a cache miss, requesting a name from a domain name service.

At step 406, an IP address of the network service is determined.

Finally at step 408, a message specifically instructing a routing table on the user's network to route data addressed to the IP address determined in step 404 is sent to the IP address determined in step 406. The message causes configuration of a router on the user's network to route data on the network service.

The term "user," as used herein, may encompass both a customer of the network connectivity service, such as an employee of a business that utilizes the network connectivity service, and a network administrator of the service provider itself. Users may also be at different companies or organizations.

The tables disclosed herein may be any stored type of structured memory, including a persistent memory. In examples, each database may be implemented as a relational database or file system.

Each of the devices and modules in FIG. 1 may be implemented in hardware, software, firmware, or any combination thereof.

Each of the devices and modules in FIG. 1 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for configuring a network to route data on a first network service that connects a user's network with a service provider network, comprising:
    (a) receiving, from a user, an instruction to route data from the user's network addressed to a hostname on the first network service;
    (b) determining, according to the hostname, a first IP address that addresses a server identified by the hostname, wherein the determining (b) comprises:
        looking up the hostname on a local cache;
        when no unexpired match is found in the local cache, looking up the hostname on a domain name service to determine the first IP address;
    (c) determining a second IP address, the second IP address of the first network service; and
    (d) sending, to the user's network, a message specifically instructing a router on the user's network to route data addressed to the first IP address to the second IP address whereby the message causes configuration of the router on the user's network to route data, addressed to the first IP address, on the first network service instead of a second network service that has a more general routing entry encompassing the first IP address.

2. The method of claim 1, further comprising:
    (e) determining that a time period has elapsed since the hostname was retrieved from the domain name service; and
    (f) when the time period is determined to have elapsed, expiring an entry for the hostname in the local cache.

3. The method of claim 1, wherein the first and second network services provide connectivity to the Internet, and wherein the sending (d) comprises sending a border gateway protocol service message to the user's network.

4. The method of claim 3, wherein the second network service is provided by the service provider via a service provider network.

5. The method of claim 4, wherein the instruction to route data received in (a) comprises a business rule instructing to switch traffic having the hostname to the first network service when traffic on the second network service reaches a utilization level, and further comprising:
    (e) determining that traffic on the second network service has reached the utilization level,
    wherein steps (b)-(d) occur when the traffic is determined to have reached the utilization level in (e).

6. The method of claim 3, wherein the second network service is provided by the other service provider different from the service provider of the first network service.

7. The method of claim 1, further comprising:
    (e) receiving a first packet on the first network service, the first packet having a source and destination IP address;
    (f) determining that the destination IP address of the first packet is the first IP address;
    when the first packet is determined to have the first IP address:

(g) modifying the source IP address of the first packet to replace with a translated IP address such that return traffic addressed to the translated IP address is routed to the first network service;

(h) forwarding the first packet with the modified source IP address;

(i) receiving a second packet from the network service provider, the second packet having a source and destination IP address;

(j) determining that the second packet has the translated IP address;

when the second packet is determined to have the translated IP address:

(k) modifying the destination IP address of the second packet to replace the translated IP address with the first IP address; and (l) forwarding the second packet with the modified destination address, wherein the modifying (g) and the modifying (k) cause return traffic that was forwarded through the first network service to be routed back to the first network service.

8. A system for configuring a network to route data on a first network service that connects a user's network with a service provider network, comprising:

a portal module that receives, from a user, an instruction to route data from the user's network addressed to a hostname on the first network service;

a DNS lookup module that determines, according to the hostname, a first IP address that addresses a server identified by the hostname and determines a second IP address, the second IP address of the first network service, wherein the DNS lookup module further looks up the hostname on a local cache, and, when no unexpired match is found in the local cache, the DNS lookup module looks up the hostname on a domain name service to determine the first IP address; and a router that sends, to the user's network, a message specifically instructing a routing table to route data addressed to the first IP address to the second IP address whereby the message causes configuration of the router on the user's network to route data, addressed to the first IP address, on the first network service instead of a second network service that has a more general routing entry encompassing the first IP address.

9. The system of claim 8, further comprising:

a refresh module that determines that a time period has elapsed since the hostname was retrieved from the domain name service and, when the time period is determined to have elapsed, expires an entry for the hostname in the local cache.

10. The system of claim 8, wherein the first and second network services provide connectivity to the Internet, and wherein the router sends the message as a border gateway protocol service message to the user's network.

11. The system of claim 10, wherein the second network service is provided by the service provider via a service provider network.

12. The system of claim 11, wherein the instruction to route data includes a business rule instructing to switch traffic having the hostname to the first network service when traffic on the second network service reaches a utilization level, and further comprising:

a policy module that determines that traffic on the second network service has reached the utilization level, wherein the router sends the message when the traffic is determined to have reached the utilization level in (e).

13. The system of claim 10, wherein the second network service is provided by the other service provider different from the service provider of the first network service.

14. The system of claim 8, wherein the router receives a first packet on the first network service, the first packet having a source and destination IP address, and determines that the destination IP address of the first packet is the first IP address, and wherein the router further comprises:

an address translation module that, when the router determines the first packet to have the first IP address: (i) modifies the source IP address of the first packet to replace with a translated IP address such that return traffic addressed to the translated IP address is routed to the first network service and (ii) forwards the first packet with the modified source IP address, and wherein the router receives a second packet from the network service provider, the second packet having a source and destination IP address and determines that the second packet has the translated IP address, wherein the address translation module, when the router determines the second packet to have the translated IP address: (i) modifies the destination IP address of the second packet to replace the translated IP address with the first IP address, and (ii) forwards the second packet with the modified destination address such that the modification of the first packet's source address and the second packet's destination address causes return traffic that was forwarded through the first network service to be routed back to the first network service.

15. A program storage device tangibly embodying a program of instructions executable by at least one machine to perform a method for configuring a network to route data on a first network service that connects a user's network with a service provider network, the method comprising:

(a) receiving, from a user, an instruction to route data from the user's network addressed to a hostname on the first network service;

(b) determining, according to the hostname, a first IP address that addresses a server identified by the hostname, wherein the determining (b) comprises:

looking up the hostname on a local cache;

when no unexpired match is found in the local cache, looking up the hostname on a domain name service to determine the first IP address;

(c) determining a second IP address, the second IP address of the first network service; and (d) sending, to the user's network, a message specifically instructing a router on the user's network to route data addressed to the first IP address to the second IP address whereby the message causes configuration of the router on the user's network to route data, addressed to the first IP address, on the first network service over a second network service that has a more general routing entry encompassing the first IP address.

16. The program storage device of claim 15, the method further comprising:

(e) receiving a first packet on the first network service, the first packet having a source and destination IP address;

(f) determining that the destination IP address of the first packet is the first IP address;

when the first packet is determined to have the first IP address:

(g) modifying the source IP address of the first packet to replace with a translated IP address such that return traffic addressed to the translated IP address is routed to the first network service;

(h) forwarding the first packet with the modified source IP address;

(i) receiving a second packet from the network service provider, the second packet having a source and destination IP address;

(j) determining that the second packet has the translated IP address;

when the second packet is determined to have the translated IP address:

(k) modifying the destination IP address of the second packet to replace the translated IP address with the first IP address; and (l) forwarding the second packet with the modified destination address, wherein the modifying (g) and the modifying (k) cause return traffic that was forwarded through the first network service to be routed back to the first network service.

17. A method for configuring a network to route data on a first network service that connects a user's network with a service provider network provided by a service provider, comprising:

(a) receiving, from a user, a business rule instructing to switch, to the first network service, data addressed to a hostname when traffic on a second network service reaches a utilization level, the second network service being provided by the service provider via a service provider network, wherein the first and second network services provide connectivity to the Internet;

(b) determining that traffic on the second network service has reached the utilization level;

when the traffic is determined to have reached the utilization level in (b):

(c) determining, according to the hostname, a first IP address that addresses a server identified by the hostname;

(d) determining a second IP address, the second IP address of the first network service; and (e) sending, to the user's network, a border gateway protocol service message specifically instructing a router on the user's network to route data, addressed to the first IP address, to the second IP address, whereby the message causes configuration of the router to route data, addressed to the first IP address, on the first network service instead of the second network service, wherein the second network service has a more general routing entry encompassing the first IP address.

18. The method of claim 17, wherein the determining (c) comprises looking up the hostname on a domain name service to determine the first IP address.

19. The method of claim 18, wherein the determining (c) further comprises looking up the hostname on a local cache, wherein the looking up the hostname on a domain name service occurs when no unexpired match is found in the local cache.

20. The method of claim 17, further comprising:

(f) receiving a first packet on the first network service, the first packet having a source and destination IP address;

(g) determining that the destination IP address of the first packet is the first IP address;

when the first packet is determined to have the first IP address:

(h) modifying the source IP address of the first packet to replace with a translated IP address such that return traffic addressed to the translated IP address is routed to the first network service;

(i) forwarding the first packet with the modified source IP address;

(j) receiving a second packet from the network service provider, the second packet having a source and destination IP address;

(k) determining that the second packet has the translated IP address;

when the second packet is determined to have the translated IP address;

(l) modifying the destination IP address of the second packet to replace the translated IP address with the first IP address; and (m) forwarding the second packet with the modified destination address, wherein the modifying (h) and the modifying (l) cause return traffic that was forwarded through the first network service to be routed back through the first network service.

* * * * *